United States Patent [19]
Heidorn et al.

[11] Patent Number: 5,222,131
[45] Date of Patent: Jun. 22, 1993

[54] TELEPHONE PROTECTOR INCLUDING REMOVABLE FUSE HOLDER

[75] Inventors: Richard H. Heidorn, Lombard; Bjarne Frederiksen, Villa Park; E. Grant Swick, Bartlett, all of Ill.

[73] Assignee: Illinois Tool Works Inc., Glenview, Ill.

[21] Appl. No.: 725,537

[22] Filed: Jul. 3, 1991

[51] Int. Cl.⁵ .............................................. H02B 1/18
[52] U.S. Cl. .................................. 379/412; 361/430; 361/431; 361/432
[58] Field of Search .................... 379/399, 412, 331; 361/430, 431, 432, 342

[56] References Cited

U.S. PATENT DOCUMENTS

| | | | |
|---|---|---|---|
| 728,195 | 5/1903 | Brady | 361/432 X |
| 1,912,614 | 6/1933 | Adam | 361/430 X |
| 2,036,044 | 3/1936 | Hammer | 361/431 X |
| 2,626,984 | 1/1953 | Cole | 361/432 X |
| 3,273,022 | 9/1966 | McRoberts | 361/431 X |
| 4,309,736 | 1/1982 | Lissillour | 379/412 X |
| 4,613,732 | 9/1986 | Cwirzen et al. | 379/412 |
| 4,721,862 | 1/1988 | Cooper | 361/430 X |
| 4,800,465 | 1/1989 | Rodgers et al. | 361/432 |

*Primary Examiner*—James L. Dwyer
*Assistant Examiner*—M. Shehata
*Attorney, Agent, or Firm*—Trexler, Bushnell, Giangiorgi & Blackstone, Ltd.

[57] ABSTRACT

A telephone protector is contained within a housing having an input connection and an output connection. The protector comprises an externally accessible fuse compartment having fuse contact pairs. A removable fuse holder capable of locating a fuse within the fuse compartment is provided. A fuse holding element is disposed on the removable fuse holder capable of holding fuses with respect to the removable fuse holder and positioning the fuse in engagement with the fuse contact pairs. Strain relief means is provided to reduce strain on the wires entering the housing.

14 Claims, 1 Drawing Sheet

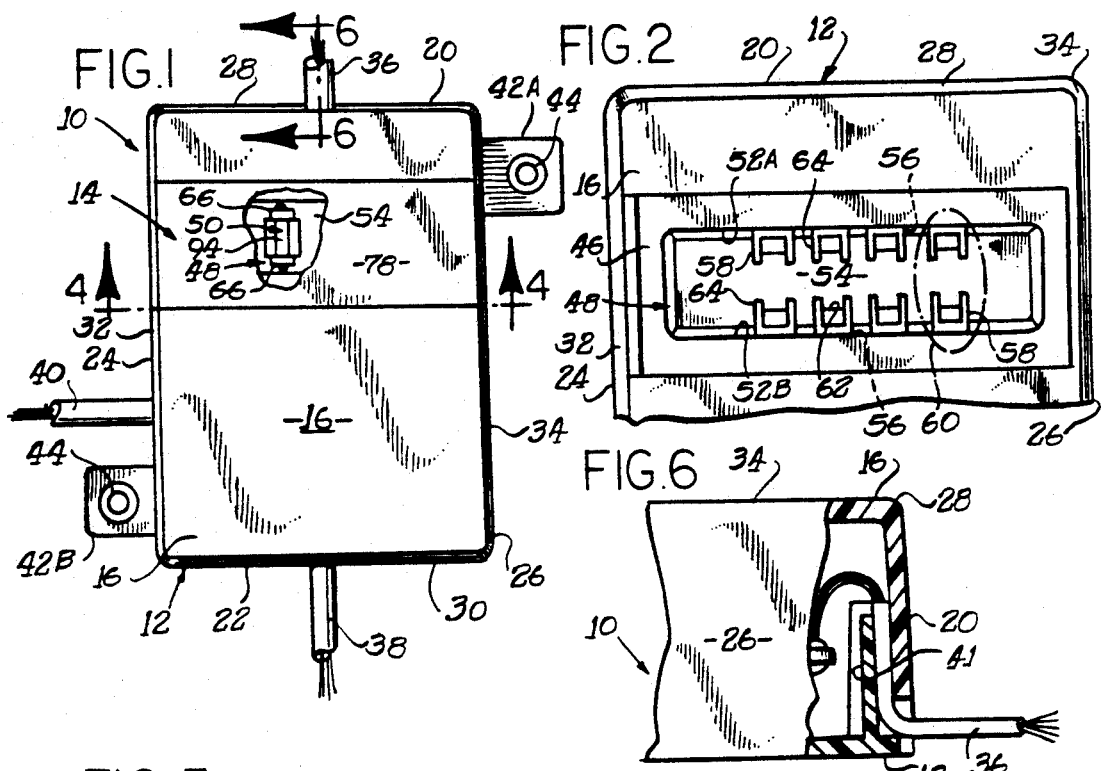
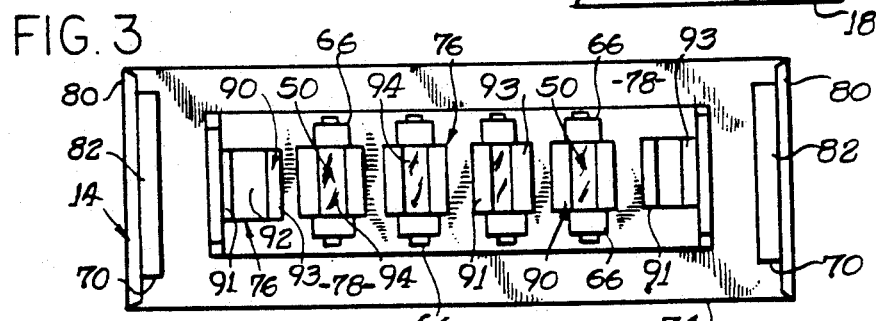
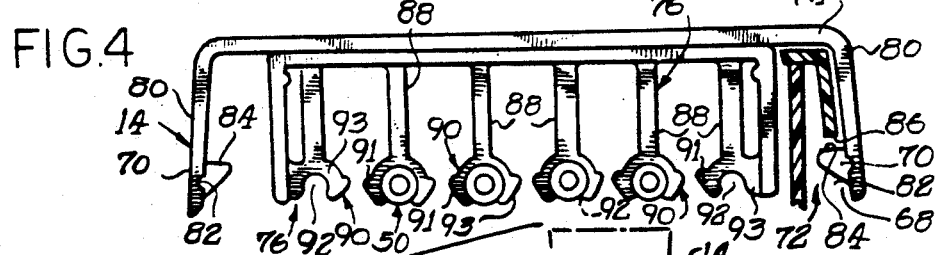
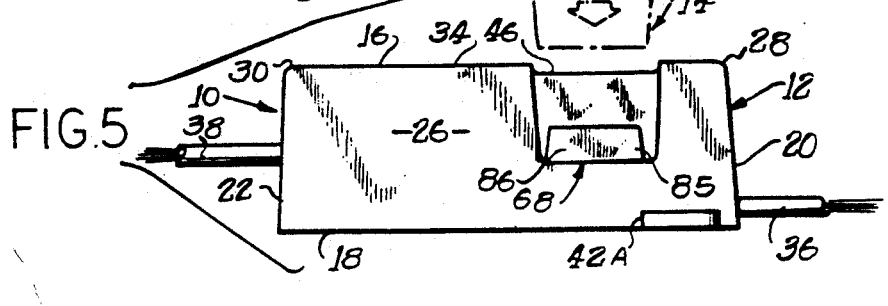

TELEPHONE PROTECTOR INCLUDING REMOVABLE FUSE HOLDER

BACKGROUND AND SUMMARY OF THE INVENTION

The present invention relates generally to a unique and useful structure for removably inserting electronic components, such as fuses, and the like, into electronic equipment. The invention relates more specifically to a unique telephone protector capable of enclosing electronic equipment useful in telecommunications applications having a uniquely constructed externally accessible removable fuse holder.

Many modern pieces of electric and electronic equipment, such as computers, telephones, and facsimile machines, have very specific power requirements, and are highly sensitive to power surges—that is a transient power pulse having a power level that exceeds the power level normally present in a certain line or connection. Given the high cost of this equipment and its repair, many equipment owners desire a way to protect their equipment from such power surges.

One popular way of protecting such equipment is to put a fuse, or a plurality of fuses, into the feeding power or telecommunications line so that the power surge encounters a fuse before it reaches the expensive equipment. If a power surge encounters a fuse, the fuse will "blow," thereby rupturing its power level sensitive element and breaking the connection between the feeder line and the equipment and protecting the equipment from the harmful surge. However, the fuses are capable of performing their function only once because the power sensitive element is not itself replaceable. After the fuse blows, it must be replaced by a new fuse. Replacement of the fuses causes many people a great deal of difficulty and frustration.

The size of the power sensitive element, and thus the size of the fuse, often depends on the power rating thereof, and is thus related to the strict power requirements of the equipment. If the fuse is intended to blow at a relatively low power level, the fuse will be quite small in size and difficult to handle. This is the case with an ever-increasing number of highly sensitive electronic equipment.

Because the fuses are so small, they are difficult to insert properly into the equipment. Further, the greater the number of these small fuses, the greater the difficulty in and the higher the level of frustration encountered while inserting the fuses properly into the equipment. Thus, it is desirable to construct a new device or structure which can reduce the difficulty inherent in inserting fuses into electronic equipment, and can substantially reduce, if not eliminate, the frustration which often accompanies the task of inserting fuses into such equipment.

OBJECTS AND SUMMARY OF THE INVENTION

A general object of the present invention is to provide a uniquely constructed housing having an externally accessible equipment receptacle with a uniquely constructed removable cover capable of releasably holding equipment.

A more specific object of the invention is to provide a uniquely constructed housing having a fuse compartment with a uniquely constructed removable cover capable of releasably holding a fuse or the like.

A further object of the invention is to provide a housing capable of retaining electronic equipment having an in-line fuse compartment and a removable cover capable of releasably holding a fuse so that the fuse is appropriately placed in-line within the fuse compartment when the cover is in the closed position.

An additional object of the invention is to provide a telephone protector having a housing and a removable cover capable of releasably holding a plurality of fuses in a position so that the fuses will be placed in-line with a telecommunications feeder line when the cover is closed.

An additional object of the present invention is to provide an electronic equipment receptacle having a removable cover bearing a plurality of electronic equipment holders.

Another object of the present invention is to provide a removable cover for a housing for electronic equipment having a tang which is insertable into a complementary notch on the housing in order to lock the cover into the closed position.

A further object of the present invention is to provide a housing having a female RJ-11 connector at one end and a male RJ-11 connector at another end so that the housing can be easily inserted into an appropriate feeder line, the housing further having a removable, externally accessible fuse holder.

An additional object of the present invention is to provide a housing for electronic equipment having a removable, externally accessible fuse holder which snaps into engagement with the housing.

Another object of the present invention is to provide a housing for electronic equipment of the above-described type having strain relief means.

A telephone protector, constructed according to the teachings of the present invention, is contained within a housing having an input connection and an output connection. The protector comprises an externally accessible fuse compartment having fuse contact means or pairs. A removable fuse holder capable of locating fuses within the fuse compartment is provided. A plurality of fuse holding elements capable of holding fuses in a disposition so as to contact the fuse contact pairs is disposed on the removable fuse holder.

BRIEF DESCRIPTION OF THE DRAWINGS

The organization and manner of the structure and operation of the invention, together with further objects and advantages thereof, may best be understood by reference to the following description taken in connection with the accompanying drawings, wherein like reference numerals identify like elements in which:

FIG. 1 is a top plan view of the telephone protector having a removable fuse holder, constructed according to the teachings of the present invention, with a portion thereof broken away to show the disposition of the fuses within the fuse compartment;

FIG. 2 is a magnified top elevational view of the fuse compartment showing the construction thereof as well as the location of the fuse contacts therein;

FIG. 3 is a magnified bottom view of the removable fuse holder showing the construction thereof holding a plurality of fuses;

FIG. 4 is a sectional view, taken along line 4—4 of FIG. 1, with a portion thereof broken away to show the residence of the cover tang within the housing notch;

FIG. 5 is a side elevational view of the housing showing the structural relationships among the housing notch, the mounting means, and the fuse compartment; and FIG. 6 is an enlarged partial sectional view, taken along line 6—6 of FIG. 1, showing the construction of the strain relief means.

DETAILED DESCRIPTION OF THE PREFERRED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring initially to FIG. 1, a telephone protector 10 comprising a housing 12 having a removable fuse holder 14 is illustrated. While the specific embodiment disclosed herein is adapted to particular employment with a telecommunications network, it is to be understood that the invention can be easily and obviously adapted for use with other electronic equipment. Furthermore, while the specific embodiment is for use with fuses, the scope of the invention is intended to cover employment thereof with other forms of electronic circuit components.

The housing 12 is substantially box-like in configuration, although other-shaped configurations can be used. The housing 12 is preferably composed of a plastic material, although other compositions can be used. The housing 12 generally comprises six panels: a first panel 16, a second panel 18, a third panel 20, a fourth panel 22, a fifth panel 24, and a sixth panel 26. The first panel 16 is substantially parallel to the second panel 18, and is substantially perpendicular to the third through sixth panels 20 through 26, respectively. The first and second panels 16 and 18 are offset from each other a certain distance.

The third panel 20 is substantially parallel to the fourth panel 22, and the fifth panel 24 is substantially parallel to the sixth panel 26. The third through sixth panels 20 through 26, respectively, are joined to the first panel 16 along separate edges thereof. Namely, the first panel 16 is joined to the third panel 20 along a first edge 28, to the fourth panel 22 along the second edge 30, to the fifth panel 24 along the third edge 32, and to the sixth panel 26 along the fourth edge 34. The edges 28 through 34 are rounded off so that the housing 12 does not present any potentially harmful sharp edges.

The third through sixth panels 20 through 26, respectively, are joined to the second panel 18 is a correspondingly complementary fashion. In this manner, the housing 12 defines an interior of sufficient size to enclose electronic equipment, not shown, but well known in the relevant art, useful in telecommunications networks. The interior defined by the housing 12 can be of various dimensions depending upon the size and configuration of the panels 16 through 26.

A plurality of electrical connections are disposed on and/or through the housing 12 so that the electronic equipment can be connected to a certain electronic circuit. Specifically, as shown in FIG. 1 and FIG. 5, the housing has an input connection 36 and an output connection 38. Preferably, the input connection 36 is disposed through the third panel 20, and the output connection 38 is disposed through the fourth panel 22.

The input and output connections 36 and 38 can be of a variety of forms depending upon the particular employment desired to be fulfilled by the housing 12. For instance, if the housing 12 contains telecommunications equipment, the input connection 36 can take on the form of a male RJ-11 connector, well known in the art, while the output connection 38 can take on the form of a female RJ-11 connector, well known in the art. Any configuration of the input and output connectors 36 and 38, respectively, can be utilized, as long as the housing 12 and the equipment contained therein can be placed in-line with the desired electronic equipment.

To facilitate the functioning of the electronic equipment contained within the housing 12, and to provide a method for discharging any power surges, the housing 12 also has a ground connection 40 which leads from the electronic equipment contained within the housing 12 to a ground source. The ground connection 40 is preferably disposed through the fifth panel 24.

As compared with the other panels, the second panel 18 is planar, and continuous. The second panel 18 is constructed in this fashion so as to flushly confront another piece of equipment to which the housing 12 is to be mounted. However, the second panel 18 can take on a different configuration depending upon the external configuration of the piece of equipment to which the housing is to be mounted.

Additionally, as shown in FIG. 6, strain relief means in the form of projecting member 41 is disposed on the second panel 18 on the inside thereof opposed to the wall or side 20. The projecting member 41 are located on the second panel 18 so as to be located in proximity to the input connection or cable 36. As illustrated in FIG. 6, when the second panel 18 is properly joined to the first panel 16, the projecting member 41 extends from the second panel 18 towards the first panel 16 within the interior of the housing 12, and close to the side 20. Accordingly, the wires or cables 36 entering the housing 12 at the input are pinched between the member 41 and the wall 20, and are guided upwardly over the projecting member 41, and then downwardly to appropriate connections on the electronic equipment encompassed by the housing 12.

By encouraging the cables 36 to take this route from the exterior of the housing 12 to its interior, strain relief is provided. Specifically, if a pulling force is applied to the wires 36, that force will act upon the portion of the cable 36 clamped between the projecting member 41 and the wall 20, and not an electrical contact between the wires 36 and the electronic equipment within the housing 12. With this construction, the structural integrity of the connections between the wires 36 and the electronic equipment is maintained. In some embodiments, the strain relief means can take on the form of joint compression, that is firmly holding the wires by compressing them between two adjacent panels 16 through 26. Joint compression is the preferred form of strain relief means for association with the ground connection 40.

In order to facilitate mounting the housing 12 to a piece of equipment, mounting means in the form of a plurality of projections 42A and 42B are disposed on the housing 12. Preferably, the projection 42A is disposed on the sixth panel 26 proximate to the juncture between the second, third, and sixth panels 18, 20, and 26, respectively, and the projection 42B is disposed on the fifth panel 24 proximate to the juncture between the second, fourth, and fifth panels 18, 22, and 25, respectively.

The projection 42A extends away, substantially perpendicularly, form the sixth panel 26, while the projection 42B extends substantially perpendicularly away from the fifth panel 24. However, the angular relationship among the projections 42A and 42B and the panels 24 and 26 can be altered to conform to an external configuration of a piece of equipment to which the housing 12 is to be mounted. Each projection 42A and 42B has a countersunk bore 44 therethrough having a diameter sufficient to accept fastening means, not shown for clarity, in the form of screws, bolts, or other well-known fasteners. In this way, the housing 12 can be mounted to another piece of equipment.

The first panel 16 has a recessed portion 46 thereon, shown clearly in FIG. 2, which forms a seat around an externally accessible fuse compartment 48. It should be noted that while the fuse compartment 48, as illustrated in FIG. 2, is particularly adapted to retaining a plurality of fuses 50, the fuse compartment 48 can be configured so as to retain a single fuse or one or more other types of electronic circuit components. The recessed portion 46 also wraps around both the third and fourth edges 32 and 34, and extends downwardly along the fifth and sixth panels 24 and 26, respectively, towards the second panel 18 a certain distance, as shown in FIG. 4 and FIG. 5. The recessed portion 46 is of sufficient dimensions to accept the removable fuse holder 14, as will be discussed herein.

The fuse compartment 48 extends downwardly from the recessed portion 46 proximate to the first panel 16 towards the second panel 18 a certain distance. The fuse compartment 48 has at least two opposing side walls 52A and 52B, and a bottom wall 54. The two opposing side walls 52A and 52B extend upwardly from the bottom wall 54 at opposite sides thereof to the recessed portion 46.

The side walls 52A and 52B each have a plurality of latitudinal slots 56 therein. Each of the slots 56 are of sufficient size to house a fuse contact 58. However, each slot 56 need not house a fuse contact 58. The number of fuse contacts 58 depends upon the particular application of the protector 10. The latitudinal slots 56 are disposed on the side walls 52A and 52B in such a fashion that the fuse contacts 58 form cooperating fuse contact means or pairs 60. The fuse contact pairs 60 are disposed and constructed so that the fuses 50 can be electrically connected therein.

The fuse contacts 58 are composed of a conducting material, such as a metal, and the like, and are constructed so as to affect a proper electrical connection with the fuses 50. Each individual fuse contact 58 comprises a contacting base 62 and a plurality of side supports 64. The contacting base 62 is substantially flat and planar, and is constructed so as to be able to contact a conducting portion 66 disposed on opposite ends of each of the fuses 50. The side supports 64 are constructed so as to guide the conducting portion 66 of the fuses 50 into proper contact with the base contact 62, and also assist in preventing lateral movement of the fuses 50 once disposed inside the fuse compartment 48.

As stated above, the recessed portion 46 extends downwardly along the fifth and sixth panels 24 and 26, respectively. A notch 68, shown clearly in FIG. 5, is disposed through the recessed portion 46 at its farthest extension towards the second panel 18 on both the fifth and sixth panels 24 and 26. The notch 68 is of sufficient size to accept a tang 70 disposed on the removable fuse holder 14, as will be discussed herein. Together with the tang 70, the notch 68 forms locking means 72, illustrated in FIG. 4, for releasably locking the fuse holder 14 in place.

Referring to FIG. 3 and FIG. 4, the precise structure of the removable fuse holder 14 will be disclosed. The fuse holder 14 generally comprises a substantially U-shaped cover or access member 74 bearing a plurality of fuse holding elements 76. The access member 74 comprises a base 78 having legs 80 attached to opposite ends of the base 78.

The dimensions of the base 78 are substantially equal to the corresponding dimensions of the seat or recessed portion 46 disposed on the first panel 16, and the dimensions of the legs 80 are substantially equal to the corresponding dimensions of the seat or recessed portion 46 disposed on the fifth and sixth panels 24 and 26, respectively. In this manner, when the fuse holder 14 is locked into position on the housing 12, the fuse holder 14 will be flush with the panels 16, 24, and 26 of the housing 12, thereby providing the protector 10 with a clean, aesthetically pleasing look.

A tang 70 is disposed on each of the legs 80. The tang 70 extends substantially perpendicularly away from each leg 80 inwardly towards the opposite leg 80. The tangs 70 have a beveled surface 82 and a flat surface 84. The beveled surface 82 is inclined at an angle so as to facilitate insertion of the tangs 70 into the notches 68 on the fifth and sixth panels 24 and 26, respectively, so as to firmly lock the fuse holder 14 in place, as shown in FIG. 4 and FIG. 5. The flat surface 84 is constructed so as to engage a periphery 86 of the notches 68 in order to prevent accidental removal of the fuse holder 14.

Preferably, to facilitate actuation of the locking means 72, the legs 80 are composed of a flexible, resilient material, such as plastic and the like, so that the legs 80 can be flexed to allow for insertion and disengagement of the tangs 70 from the notches 68. After the tangs 70 are firmly within the notches 68, a space 85 is formed on the fifth and sixth panels 24 and 26. This space 85 is of sufficient size to accept a portion of a suitable tool, in order to facilitate release to the tangs 70 from the notches 68.

The plurality of fuse holding elements 76 extend substantially perpendicularly away from the base 78. The fuse holding elements 76 comprise a trunk 88 and an arcuate grip portion 90 defining a fuse socket 92. The trunk 88 is connected at one end to the base 78 and is connected at the other end to the arcuate portion 90. The trunk 88 and the arcuate portion 90 are of sufficient strength and thickness so as to be able to firmly hold the fuses 50.

The arcuate portion 90 includes opposed finger portions 91 and 93 which define the fuse socket 92 of sufficient diameter to accept the body 94 of the fuse 50. The arcuate portion 90 is composed of a flexible, resilient material so that the finger portions 91 and 93 can flex and the fuses 50 can be easily snapped into and out of the fuse sockets 92. The arcuate portions 90 are of a length sufficient to allow the fuse socket 92 to encompass substantially the entire body 94 of the fuse 50, but the length of the arcuate portion 90 is not long enough to encompass the conducting portions 66 of the fuses 50. Thus, as shown in FIG. 3, the conducting portions 66 of the fuses 50 extend beyond the arcuate portions 90 so that they may contact the base contacts 62.

The operation of the protector 10 will be discussed in the following paragraphs. Beginning with the fuse holder 14 removed, and the fuse sockets 92 bearing no fuses 50, the housing 12 is mounted to a desired piece of equipment by inserting fasteners through the countersunk bores 44 on the mounting means 42A and 42B. Now the fuses 50 are inserted into the fuse sockets 92.

With the base 78 being firmly supported, each fuse 50 is inserted into its own fuse socket 92. The body 94 of each fuse 50, in turn, is aligned with the fuse sockets 92 so that the contacting portions 62 of each fuse 50 extends beyond the arcuate portion 90 of each respective fuse holding element 76. The fuses 50 are then snapped into the fuse sockets 92. Because the fuses 50 are already in the appropriate configuration for proper insertion into the fuse contacting pairs 60, all that need be done is to place the fuse holder 14 into the closed position on the housing 12.

The legs 80 are positioned so that they overlap the recessed portion 46 disposed on the fifth and sixth panels 24 and 26. With the application of an appropriately directed force, the fuse holder 14 is moved downwardly until the tangs 70 snap into the notches 68. Coincidentally, the fuses 50 are properly inserted into the fuse contact pairs 60. Thus, the present invention presents a novel means for inserting fuses 50 or other electronic equipment into a circuit which is less difficult and substantially less frustrating than other, currently available methods.

While a preferred embodiment of the present invention is shown and described, it is envisioned that those skilled in the art may devise various modifications of the present invention without departing from the spirit and scope of the appended claims. The invention is not intended to be limited by the foregoing disclosure, but only by the following appended claims.

The invention claimed is:

1. A telephone protector, contained within a housing comprising: an externally accessible fuse compartment containing fuse contact means within; a removable fuse holder for locating a fuse within the fuse compartment; said removable fuse holder having a fuse holding element for supporting the fuse so as to expose each end of the fuse for direct contact with the fuse contact means when the removable fuse holder is properly positioned in the fuse compartment.

2. A telephone protector as defined in claim 1 further comprising locking means for locking the removable fuse holder to the housing.

3. A telephone protector as defined in claim 1 further comprising mounting means disposed on the housing for mounting the housing to another object.

4. A telephone protector as defined in claim 2 wherein the locking means comprises a tang and a notch.

5. A telephone protector as defined in claim 1 wherein the fuse holding element comprises a trunk extending from the removable fuse holder, and an arcuate portion connected to the trunk on an end thereof opposite to the removable fuse holder, the arcuate portion defines a fuse socket for releasably holding a fuse.

6. A housing capable of retaining electronic equipment comprising: an externally accessible compartment containing electrical contacts; the externally accessible compartment being capable of releasably retaining an electronic circuit element in a disposition so that the electronic circuit element engages the electrical contacts; a removable access member covering the externally accessible compartment, the access member and the housing being in a flush arrangement when the removable access member is properly disposed within the housing; an electronic circuit element holding element disposed on the removable access member; and the holding element being capable of holding the electronic circuit element and of locating the electronic circuit element in a position where the electronic circuit element connects with the electrical contacts.

7. A housing as described in claim 6 further comprising locking means for releasably holding the removable access member over the externally accessible compartment.

8. A housing as described in claim 6 wherein the electronic circuit element comprises a fuse.

9. A housing as described in claim 7 further comprising a space located in proximity to the locking means which allows for unlocking of the locking means.

10. A housing as described in claim 6 wherein the housing has an input connection and an output connection capable of accepting wires, and strain relief means for relieving strain on the wires associated with at least one of the input and output connections.

11. A housing as described in claim 10 wherein the strain relief means comprises a projecting member extending from a wall of the housing and opposing an adjacent side wall of the housing for clamping a wire between the projection and the side wall.

12. A housing as described in claim 10 wherein the housing is comprised of a plurality of joined panels, and the strain relief means comprises joint compression.

13. A housing for retaining an electronic circuit component comprising: an externally accessible compartment for receiving an electronic circuit component to be connected to electrical contacts disposed in the housing; a detachable access member for covering the externally accessible compartment such that when the access member covers the compartment, the housing and the access member lie in a flush arrangement; and a holding element on the detachable access member for holding the electronic circuit component with respect to the detachable access member and positioning the electronic circuit component in engagement with the electrical contacts when the detachable access member is properly disposed on the housing.

14. A housing for retaining an electronic circuit component comprising: an externally accessible compartment for receiving an electronic circuit component having a conducting portion to be directly connected to electrical contacts disposed in the housing; a detachable access member for covering the externally accessible compartment; and a holding element on the detachable access member for holding the electronic circuit component such that the conducting portion is exposed and for positioning the electronic circuit component such that the conducting portion directly engages the electrical contacts when the detachable access member is properly disposed on the housing.

* * * * *